United States Patent [19]

Swanson

[11] Patent Number: 4,518,220
[45] Date of Patent: May 21, 1985

[54] FIBER OPTIC DRAWER CONNECTOR ASSEMBLY

[75] Inventor: Steven E. Swanson, Williamsport, Pa.

[73] Assignee: GTE Products Corporation, Stamford, Conn.

[21] Appl. No.: 480,545

[22] Filed: Mar. 30, 1983

[51] Int. Cl.³ .................................................. G02B 7/26
[52] U.S. Cl. .................................................. 350/96.20
[58] Field of Search ................. 350/96.20, 96.21, 96.22

[56] References Cited

U.S. PATENT DOCUMENTS

| 4,155,624 | 5/1979 | Logan et al. | 350/96.21 |
| 4,167,303 | 9/1979 | Bowen et al. | 350/96.21 |
| 4,461,538 | 7/1984 | Breed et al. | 350/96.2 |

FOREIGN PATENT DOCUMENTS 56-30111 3/1981 Japan .................................. 350/96.2

OTHER PUBLICATIONS

Millet, IBM Tech. Disc. Bull., vol. 14, No. 3, Aug. 1971, "Connector Mount for Fiber Optic Bundle", p. 725.

Primary Examiner—William L. Sikes
Assistant Examiner—Frank González
Attorney, Agent, or Firm—John A. Odozynski; William H. McNeill

[57] ABSTRACT

A fiber optic drawer connector assembly comprises an insert having an inner cavity for the insertion of an optical lens assembly and an associated ferrule fiber holder. The insert is at least partially surrounded by a shroud and the shroud in turn positioned in the interior of a housing so that a flange at the end of the shroud comes into abutment with a stopping member at one end of the housing. The housing, as well as subassemblies enclosed thereby, is designed to be inserted into and through an aperture in a wall until an intermediate flange extending from the exterior surface of the housing comes into contact with a surface on one side of the wall. A cap is threaded over an open end of the housing and into abutment with an insert flange. Springs are provided so that the insert is maintained in secure relationship to the housing and shroud and so that the lens and ferrule are secure within the insert.

2 Claims, 1 Drawing Figure

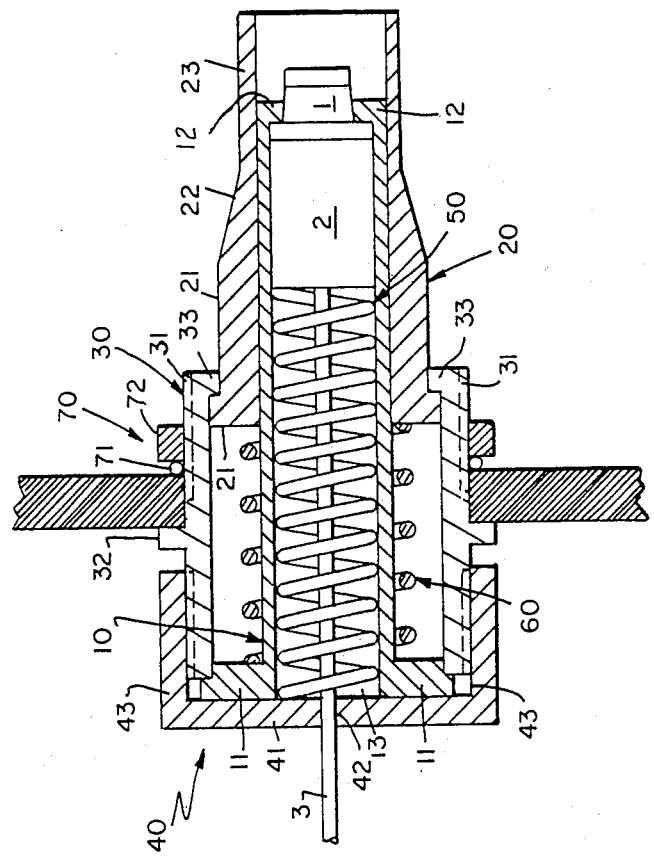

FIBER OPTIC DRAWER CONNECTOR ASSEMBLY

TECHNICAL FIELD

The invention relates to fiber optic connector assemblies and, more particularly, to a drawer connector assembly comprising an insert, shroud, housing and cap for an optical fiber, lens assembly and an associated ferrule.

BACKGROUND OF THE INVENTION

There are many advantages to tansmitting light energy via optical fiber waveguides and the use thereof is diverse. Single or multiple fiber wave guides may be used simply for transmitting light to a remote location. Complex communication systems may transmit multiple specific optical signals. These devices often require the coupling of fibers in end-to-end relationship. The coupling is a source of light loss with axial misalignment representing a particularly serious problem. Other factors causing signal loss are angular misalignment of fibers, longitudinal separation of fiber ends and reflection or refraction at the fiber ends.

In response to the need to efficiently couple separate optical fibers, various approaches have evolved. U.S. Pat. No. 4,257,674, "Elastomeric Splice", to Griffin et al., is directed to a splice or holder fabricated from an elastomeric material. The substantially cylindrical splice exhibits an axially aligned opening characterized by a diameter smaller than the diameter of the optical fiber. As a fiber is inserted into the opening, the walls of the splice tend to expand. Elastomeric restoring forces exerted on the fiber tend to maintain proper axial alignment. In a preferred embodiment, the axial aligned opening exhibits a triangular cross-section so that contact is made and restoring force applied to the fiber at three points on its circular cross-section.

U.S. patent application Ser. No. 112,991, entitled "Optical Fiber Connector" by W. John Carlsen, (now abandoned) describes an optical fiber connector utilizing the fiber holder described above. The connector body is molded from an optical quality plastic and comprises a convex lens recessed a predetermined distance from a reference surface. A second surface, parallel to the reference surface, has a point displaced approximately one focal length from the lens and defines a focal plane for the lens. The connector body has a substantially cylindrical cavity into which the fiber holder is inserted. In operation, an optical fiber is inserted into the axial opening in the holder until it abuts the second surface. Light emanating from the end of the fiber diverges and propogates approximately one focal length, where it impinges on the molded lens. The molded lens effectively collimates the divergent optical beam into a parallel beam.

Clearly such a connector system comprising back-to-back connectors, each including a fiber holder and lens assembly, represents a substantial advance in heretofore known techniques for coupling optical signals from one fiber to another. A primary advantage of the collimating, or expanded beam, lens connector is its relative immunity to axial misalignment or lateral separation of the optical fibers.

The subject invention is directed to a drawer connector assembly, the assembly designed to accommodate a spring-loaded and expanded beam lens, as described above.

The drawer connector assembly is designed to be readily field installable and requires no critical length gauging of the optical fibers. The assembly affords enhanced flexibility inasmuch as individual plug and receptacles may be interchanged without reconnection of the optical fiber. The invention accepts optical fibers of varying diameters while limiting the insertion loss of mated pairs to 1.0 db.

DISCLOSURE OF INVENTION

The above and other objects, advantages and capabilities are achieved in one aspect of the invention by a fiber optic drawer connector assembly. The assembly comprises an insert having an inner cavity for the insertion of an optical lens and an associated ferrule fiber holder. The insert is at least partially surrounded by a shroud and the shroud in turn positioned in the interior of a housing so that a flange at the end of the shroud comes into abutment with a stopping member at one end of the housing. The housing, as well as subassemblies enclosed thereby, is designed to be inserted into and through an aperture in a wall to the point at which an intermediate flange extending from the exterior surface of the housing comes into contact with a surface on one side of the wall. A cap is threaded over an open end of the housing and into abutment with an insert flange. Springs are provided so that the insert is maintained in secure relationship with both the housing and shroud and so that the lens and ferrule are secure within the insert.

BRIEF DESCRIPTION OF THE DRAWING

The sole drawing is a cross-sectional representation of the subject fiber optic drawer connector assembly, showing as well, for completeness, an associated lens, acrylic ferrule and optical fiber.

DESCRIPTION OF A PREFERRED EMBODIMENT

Referring now to the drawing, the subject fiber optic drawer connector assembly includes a unitary, generally cylindrical, insert 10 having a longitudinal axis and exhibiting a radially outwardly extending flange 11 at one end and a radially inwardly turned portion, or flange 12, at the other end. The insert provides a cylindrical cavity 13 for the insertion of an expanded beam (e.g. collimating) lens, 1, an associated ferrule, 2, and a glass fiber 3. (Neither the lens, ferrule or fiber constitute part of this invention but are shown merely to complete the description.)

A shroud 20 provides a cavity complementary to the outside contour of the insert 10, in this case cylindrical, and includes a flange portion 21, and a tapered or beveled intermediate portion 22 joining the flange portion to a narrowed end portion 23.

A housing, 30, surrounds a portion of the shroud 20 as well as the insert 10, at the end removed from the lens, and comprises an interior surface and a threaded exterior surface 31. A unitary, radially outwardly extending flangelike member 32 circumscribes the exterior surface of the housing 30 at a point intermediate the ends of the housing. The housing 30 also exhibits a radially inwardly extending stopping portion 33 at one end. The stopping portion 33 is designed to come into abutment with the flange portion 21 of the shroud 20 upon a completion of the connector assembly.

A threaded, angular, generally U-shaped cap 40 comprising a center portion 41, with a central aperture 42 for the insertion of glass fiber 3 and a wall portion 43 surrounds the housing 30 at one end. The interior surface of the wall 43 is threaded so that the cap 40 may be mated with the housing 30.

A first spring 50 is inserted into the cavity 13 of the insert 10 and a second spring 60 occupies an area inside the housing 30 between the insert flange 11 and the shroud flange 21. Retaining means 70, in the form of an O-ring 71 and lock nut 72 surround the housing 30 and operate to maintain the housing 30 in a relatively fixed relation relative to a wall into and though which the housing 30 is inserted.

Operation and cooperation of the above-described elements is as follows, though not necessarily in the precise order explicated. The lens assembly 1, ferrule 2 and associated glass fiber 3 are inserted into the insert cavity 13 in the direction of flange 12. Spring 50 is thereafter inserted into the cavity 13 and the insert 10 is positioned in the shroud 20 as shown. Housing 30 is inserted through a complementary, i.e., circular, aperture in the wall until flange 32 abuts a surface of the wall. The O-ring 71 is then inserted over the housing 30, on the opposite side of the wall, and the lock nut 72 thread onto the housing 30 so that the housing 30 is brought into a substantially secure relationship with the wall.

Finally the cap 40 is threaded over the housing 30 so that center portion 41 comes into contact with flange 11. Flange 11 exhibits a plateaued profile thereby providing a notch into which a corner of the housing 30 is designed to fit. Springs 50 and 60 maintain a secure relationship among the various connector components.

Accordingly, while there has been disclosed and described what at present is believed to be a preferred embodiment of a fiber optic drawer connector assembly, it will be obvious to those skilled in the art, that various changes and modifications may be made therein without departing from the scope of the invention as defined by the appended claims.

INDUSTRIAL APPLICABILITY

The subject drawer connector assembly is useful in communication and information delivery systems incorporating fiber optical fibers as a mode of transmission.

What is claimed is:

1. A fiber optic drawer connector assembly, the assembly comprising:
    a unitary, generally cylindrical insert having a radially outwardly extending flange portion at one end and a radially inwardly extending flange portion at the other end, said insert providing an inner cavity for accommodating a lens assembly and an associated ferrule,
    a unitary, generally cylindrical shroud surrounding at least a portion of the insert and having a flange portion at one end,
    a housing surrounding at least a portion of the shroud and a portion of the insert and having a cylindrical contour with an interior surface and a threaded exterior surface, a flangelike member extending radially outwardly at an intermediate point on the exterior surface of the housing, and a radially inwardly extending stopping portion at one end for abutment with the flange portion of the shroud, and
    a cap characterized by an angular U-shaped cross-section and having a threaded inner surface for engagement with the threaded surface of the housing,
    a first spring inserted into the cavity of the insert, and
    a second spring surrounding the insert and disposed between the insert radially outwardly extending flange portion and the flange portion of the shroud, and
    retaining means surrounding the outer surface of the housing for maintaining the housing in a substantially fixed relationship with a planar surface through which the housing is inserted,
    whereby a lens assembly and associated ferrule may be inserted into the shroud, the shroud into the housing so that the flange portion of the shroud tends to abut the stopping portion of the housing, the housing inserted through a complementary opening in a plane so that the housing flangelike member tends to abut a first surface of the plane, the retaining means positioned around the housing into contact with a second surface of the plane and the cap mated to the housing so that a central segment of the cap comes into contact with the radially outwardly extending flange portion of the insert whereby the first spring maintains the lens and associated ferrule in a secure position within the insert cavity.

2. A fiber optic drawer connector assembly as defined in claim 1 wherein the retaining means comprises an O-ring and a lock nut.

* * * * *